Figure 1:
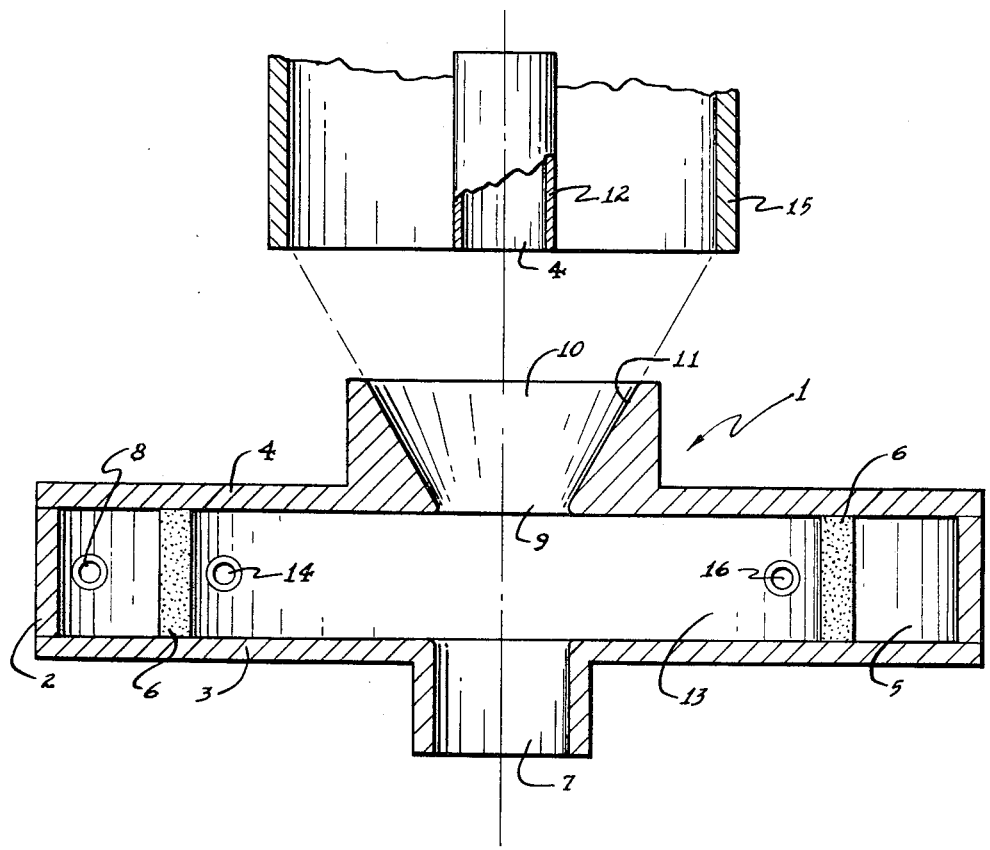

April 7, 1970   D. R. JONES   3,504,688
SIGNAL LIMIT DETECTOR FOR VORTEX AMPLIFIERS
Filed Dec. 9, 1964   2 Sheets-Sheet 1

INVENTOR
D. ROLAND JONES
BY Hurwitz & Rose
ATTORNEYS

April 7, 1970     D. R. JONES     3,504,688
SIGNAL LIMIT DETECTOR FOR VORTEX AMPLIFIERS
Filed Dec. 9, 1964     2 Sheets-Sheet 2

INVENTOR
D. ROLAND JONES

BY *Hurwitz & Rose*

ATTORNEYS

United States Patent Office 3,504,688
Patented Apr. 7, 1970

3,504,688
SIGNAL LIMIT DETECTOR FOR VORTEX AMPLIFIERS
Donnie R. Jones, Silver Spring, Md., assignor to Bowles Engineering Corporation, Silver Spring, Md., a corporation of Maryland
Filed Dec. 9, 1964, Ser. No. 417,851
Int. Cl. F15c 1/16
U.S. Cl. 137—81.5                 11 Claims The present invention relates to readout device sfor vortex amplifiers, and more particularly, to a readout device for producing an indication that the rate of rotation of the fluid exiting from a vortex amplifier has attained a predetermined rotation velocity.

A vortex amplifier in its simplest form may comprise a substantially hollow cylindrical chamber and a pair of end plates for enclosing the chamber. An outlet orifice is formed in one or both of the end plates, the center of the orifice or orifices being concentric with the axis of the cylindrical chamber. The outlet orifice has a diameter considerably smaller than the diameter of the cylindrical chamber and, as a result of vortical flow induced in the chamber, the rotational velocity of the fluid at the egress orifice or orifices is greater than the rotational velocity of fluid at the outer periphery of the chamber by approximately the ratio of the radius of the chamber to the radius of the egress orifice. Thus, if rotational flow is induced in the chamber by some means, such as a fluid input signal applied at the periphery of the chamber, the rotational velocity of the fluid exiting from the egress orifice has been amplified by the aforesaid ratio. In consequence, the rotational velocity of the fluid at the outer periphery of the cylindrical chamber is amplified in a vortex amplifier by a fixed factor and measurement of the rate of rotation of the output signal provides an indication of the rotational velocity of the input signal.

In the conventional vortex amplifier output, detectors or readout devices are provided for sensing the direction and rate of rotation of the fluid over a desired range of operation. In accordance with the present invention, however, an output means is provided for determining when the rotational velocity of the fluid exiting from the egress orifice of the vortex amplifier has attained a predetermined rotational velocity.

It is a known fact that, as rotating fluid exits from a vortex chamber, if the fluid is unconfined, it fans out in a conical pattern, the apical angle of the cone being determined by the rate of rotation of the fluid.

The present invention makes use of the fact that the unconfined rotating fluid has a conical pattern with an apical angle determined by the rate of rotation of the fluid. The present invention provides an axial flow path for fluid exiting from a vortex chamber, which flow path is defined by an outwardly flaring wall defining a hollow cone having a predetermined apical angle. Fluid issuing from the associated egress orifice which has no rotational component; that is, a rotation has not been induced to the vortex chamber by an input signal, proceeds axially through the output passage to an axially aligned receptor. As rotation is induced in the fluid and the fluid develops an apical angle, there is a gradual decrease in the amount of fluid received by the axially aligned receiving passage. However, as the rotation of the fluid increases, the apical angle of the fluid begins to approach the apical angle of the wall defining the output passage. When the fluid approaches sufficiently close to the wall, boundary layer effects are developed which cause substantially all of the fluid to attach to the wall, thereby causing a very rapid and large reduction in the amount of fluid proceeding to the receiver. More particularly, when a boundary layer of the type defined is developed, a partially solid cone of fluid is no longer formed, but the fluid acquires a sheet formation which lies against the conically shaped wall. Thus, by selection of the apical angle of the conically shaped wall, a signal may be provided indicating the fact that the rate of rotation of the fluid exiting from the vortex chamber has acquired a predetermined rotational velocity.

Vortex amplifiers are often provided with two egress orifices and a readout device as described above may be associated with each such orifice. If the apical angles of the walls defining the two outlet passages from the vortex chamber are different then boundary layer effects are established at different rates of flow. Thus, it is possible to detect the fact that the rate of rotation has fallen below a lower limit by determining when flow detaches from the wall having the lesser apical angle and has risen beyond the upper limit of the range by determining when flow attaches to the wall having the greater apical angle.

It is an object of the present invention to provide an output device for vortex amplifiers which produces an indication that the fluid exiting from the vortex amplifier has achieved a predetermined rate of rotation.

It is another object of the present invention to provide a readout device for vortex amplifiers which causes the fluid exiting from the amplifier to assume a substantially completely hollow conical pattern upon the fluid achieving a predetermined rate of rotation.

It is yet another object of the present invention to provide a readout device for fluid amplifiers including an output passage from the vortex amplifier having a conical pattern and an axially aligned fluid receptor so that, when the rotational velocity of the fluid exiting from the amplifier achieves a predetermined rotational velocity, the fluid locks onto the conical walls of the output passage and fluid is completely diverted from the axially aligned fluid receiver.

Still another object of the present invention is to provide a readout device for vortex amplifiers for determining when the rate of rotation of fluid exiting from a vortex amplifier falls below the lower limit of a predetermined range of rates of rotation and rises above the upper limit of the aforesaid range.

Figure 2:
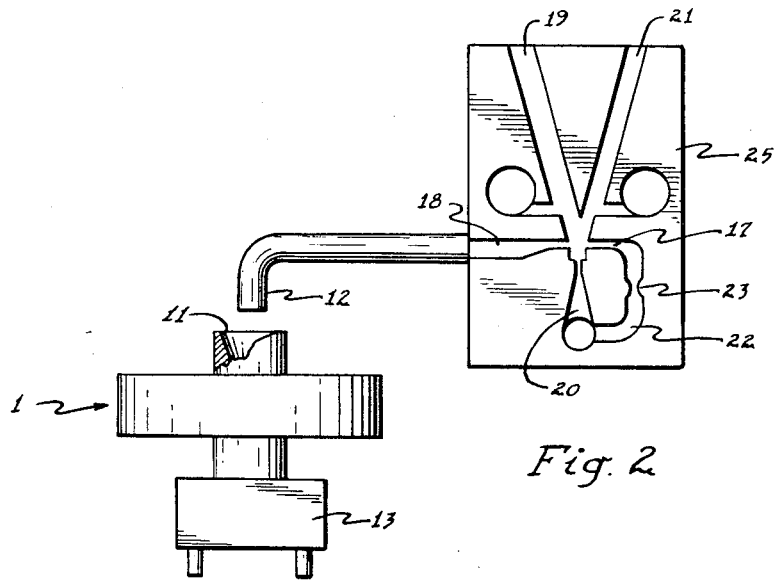
Figure 3:
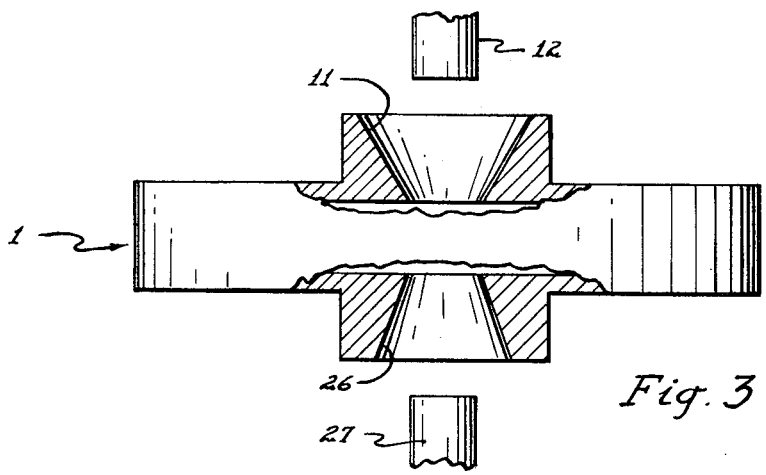

The above and still further objects, features and advantages of the present invention will become apparent upon consideration of the following detailed description of one specific embodiment thereof, especially when taken in conjunction with the accompanying drawings, wherein:

FIGURE 1 of the accompanying drawings is a cross-sectional view in elevation of a vortex amplifier equipped with a readout device of the present invention;

FIGURE 2 is a schematic diagram of a measuring system for determining when the rotational velocity of the fluid exiting from the vortex amplifier has achieved a predetermined velocity; and FIGURE 3 is a view in elevation of a vortex amplifier equipped with two of the readout devices of the present invention.

Referring now specifically to FIGURE 1 of the accompanying drawings, there is illustrated a vortex amplifier generally designated by the reference numeral 1. Amplifier 1 comprises a hollow, cylindrical wall or annulus 2 having a bottom plate 3 and a top plate 4 to enclose the space defined by the annular wall 2. Spaced a predetermined distance inwardly from the wall 2 is a fluid pervious wall 6 which defines a region 5 between the walls 2 and 6. The region 5 is provided with fluid through an input passage 8.

The fluid in the absence of an input signal proceeds through the wall 6 and radially to egress orifices 7 and 9 formed in the bottom and top walls 3 and 4, respectively. The egress orifice 7 is not essential to the operation of the apparatus of the present invention and the orifice may be closed by making the wall 3 a solid member. On the other hand, the egress orifice 7 may be provided and the fluid diverted to this orifice may be applied to a directional and rate of rotation sensing readout device such as disclosed in my copending application, Ser. No. 301,868, filed Aug. 13, 1963, for "Readout for Vortex Amplifier," now Patent No. 3,272,213. If the latter expedient is followed, then a continuous reading of direction and rate of rotation of the fluid may be provided in conjunction with the novel reading provided by the apparatus now to be described.

The egress orifice 9 communicates with a conical region 10 defined by an outwardly flaring wall 11 coaxial with the axis of the orifice 9 and, therefore, coaxial with the axis of the wall 2. Located downstream of the end of the wall 11 is a hollow tube or fluid receptor 12 which is coaxial with the wall 2 of the chamber of the device.

Fluid introduced into the region 5 through pipe 8 normally flows through the wall 6 and radially through the region interiorly of the wall 6 to the egress orifices 7 and 9 where it exits with radial non-rotational flow. In order to induce rotation to the fluid in the region interiorly of the wall 6, this region hereinafter being designated by the reference numeral 13, fluid may be introduced tangentially into this region through input signal passages 14 and 16. The flow through passage 14 induces rotation in one direction while flow through the passage 16 induces rotation in the opposite direction.

In operation, if no fluid is introduced through either of the input passages 14 and 16, and the fluid exiting through the egress orifice 9 has linear flow only, and a large portion of the exit flow proceeds to the tube 12 and thence, as illustrated in FIGURE 2, to a fluid pressure or flow measuring device. Upon the introduction of fluid through either of the input passages 14 and 16, rotation is induced in the fluid in the chamber 13 and the rate of rotation increases as the fluid proceeds towards the center of the device, the increase in the rate of rotation being determined as previously indicated by the ratio of the diameter of the outer periphery of the chamber 13 and the diameter of the egress orifice 9. Thus, the fluid exiting through the egress orifice 9 has a rate of rotation determined by the rate of flow through the input passage and a linear component of flow determined by the rate at which fluid is introduced into the system through the pipe 8.

The relative rates of linear and rotational flow of the fluid determines the apical angle of the fluid upon exiting from the egress orifice 9. For purposes of explanation, it is assumed that all of the fluid moves outwardly through the same apical angle. It is apparent that the fluid adjacent the axis of the orifice 9 must move a greater radial distance to clear the wall of the pipe 12 than the fluid at the outer perimeter of the egress orifice 9. Since these fluids are moving at the same angle relative to the axis of the passage, the apical angle of flow required for the inner fluid to clear the wall of pipe 12 is greater than that required for the outer flow to clear the wall of the pipe. Thus, when the rate of rotation of the fluid is small only the outer portion of the stream issuing through the egress orifice 9 is deflected a sufficient distance to be positioned outwardly of the pipe 12 by the time the fluid has traversed the axial distance to the pipe 12. The fluid adjacent the inner region of the stream is captured by the pipe 12.

As the rate of rotation of the stream increases, the amount of fluid collected by the pipe 12 decreases as the tangent function of the apical angle. As the rate of rotation of the stream further increases and the stream approaches the wall 11, a boundary layer is developed between the wall and the stream, and the stream attaches to the wall. At this time, due to the differential in pressure developed across the stream as a result of the boundary layer effect, the fluid adjacent the inner portion of the stream to be deflected through a substantially greater angle than the fluid in the outer perimeter of the stream, so that the fluid stream issuing from the orifice 9 now assumes the shape of a thin-walled, hollow cone. In consequence, all of the fluid is now diverted away from the passage or pipe 12.

It is apparent that the pipe 12 may be of sufficient diameter and sufficiently close to the egress orifice 9 that, prior to attachment of the stream to the wall 11, a readily measurable portion of the stream is flowing to the pipe 12. On the other hand, the pipe 12 must be of such a diameter and axial location that, upon attachment of the stream to the wall 11, substantially none of the fluid of the stream enters the passage 12. The distance of the pipe 12 from the orifice 9 and the diameter of the pipe therefore must be determined in conjunction with the apical angle of the wall 11 to insure that the device has the aforesaid characteristics.

It is therefore apparent that, by appropriate design, the apparatus of FIGURE 1 causes fluid to be directed to the pipe 12 so long as the rate of rotation of the fluid is below a predetermined rate, and once the fluid has attained this predetermined rate, substantially all flow to the pipe 12 is terminated. It must be appreciated, that, as the rate of rotation of the fluid increases from no rotation to a point immediately below the specific rate to be determined, there is a continuous decrease in the fluid directed to the pipe 12, but the decrease effected when the fluid attains the aforesaid predetermined rate of rotation is considerably greater and, therefore, may be easily detected.

The apparatus may also or alternatively be provided with an annular receptor 15 which is coaxial with the wall 11 and in line therewith. This annular receiver will receive fluid substantially only when the output fluid attaches to the wall 11. Thus, the change in flow to this receptor is quite marked and easily detected.

Referring now specifically to FIGURE 2 of the accompanying drawings, there is illustrated a system for measuring, or more particularly, determining when the output signal of the vortex amplifier system of FIGURE 1 has attained a predetermined rate of rotation. Elements of FIGURE 2 corresponding to those of FIGURE 1 bear the same reference numerals. The vortex amplifier 1 is disclosed as being equipped with a readout device 13 to provide, if so desired, a continuous indication of directon and rate of rotation of the fluid output signals from the amplifier. The device 13 may be of several types and may be of the type of the aforesaid application, or may be another type of conventional vortex readout device.

The apparatus for sensing or indicating the fact that the output fluid has attained a predetermined rate of rotation is indicated generally by the reference numeral 25. The apparatus is a conventional proportional fluid amplifier having a power nozzle 20, a right control nozzle 17, a left control nozzle 18, and output passages 19 and 21.

The right control passage nozzle 17 is connected to receive fluid from the power nozzle 20 via a branch passage 22 having a fluid restricter 23 located therein. In consequence of this arrangement, a fluid signal of a predetermined level is issued from the control nozzle 17 and serves as a standard of comparison for the fluid signals applied to the left control nozzle 18 from the readout pipe 12 of the fluid amplifier 1. When the rate of rotation of the fluid issuing from the vortex amplifier 1 is below a predetermined value as determined by the apical angle of the wall 11, the fluid entering the pipe 12 is sufficient to divert the stream issuing from the power nozzle 20 to output passage 21. However, when the fluid issuing from the amplifier attains a predetermined rate of rotation and attaches to the wall 11 substantially no fluid flows to the pipe 12 and thus fluid no longer issues from the control nozzle 18 of the amplifier 25. Under these conditions, the fluid issuing from the right control nozzle 17 deflects the power stream issuing from the power nozzle 20 to the output passage 19 and fluid no longer flows to the passage 21.

Any conventional sensing, measuring or display device may be connected to the output passage 19 or for that matter to the output passage 21 to indicate a switch of fluid from the one passage to the other. Both of the passages may be connected in a differential form to a differentially driven device.

The apparatus of the present invention has particular utility in control apparatus where it is desired to sense a dangerous condition or abnormal operation. For instance, one of the tubes 14 or 16 may have a flow developed therein indicative of rate of flow of fluid through a pipe. It may be wished to indicate abnormally high flow rates and the apparatus of the invention can provide just such a condition.

It is to be noted that, although the member defining the wall 11 is illustrated as integral with end wall 6 of the amplifier, this member may be detachably mounted so that members having walls with different apical angles may be employed. Variable angle devices may also be employed. Such are well known in the field of rockets where it is often desired to vary the apical angle and consequently area of a rocket nozzle.

The readout device of the present invention has been described as applied to only one of the two readout channels from the amplifier 1. It is not intended to so restrict the invention and, in fact, two such readout devices may be profitably employed with a single amplifier.

Referring now specifically to FIGURE 3 of the accompanying drawings, there is illustrated a vortex amplifier having two readout devices of the type provided by the present invention. Specifically, the vortex amplifier 1 is provided with the conical wall 11 and readout pipe 12 of FIGURE 1 and is further provided with a conical wall 26 and readout pipe 27. The apical angle of the wall 26 may be greater or less than the apical angle of the wall 11 so that a sudden change in flow to the pipe 27 occurs at a rate of rotation different from the rate at which the flow to pipe 12 changes. Thus, a range of rotations may be bracketed and the apparatus of the present invention is capable of indicating any deviation in rates of rotation beyond the limits established by the apical angles of walls 11 and 26. Specifically, the lower end of the range is determined by termination of angle while the upper end of the range is determined by lock-on to the wall having the greater apical angle.

What I claim is:

1. A device for sensing rate of rotation of an unconfined stream of fluid having an axial rate of flow, comprising a hollow member having an outwardly diverting inner wall providing large and small openings at the opposite ends of said member, means for introducing fluid through the small opening in said member, whereby rotating fluid proceeding through said small opening flares outwardly in the region between said small and large openings at an apical angle functionally related to the rate of rotation of the fluid, said inner wall having a predetermined apical angle such that for rates of rotation of the fluid above a predetermined value of said fluid approaches sufficiently close to said inner wall to produce boundary layer effects between the fluid and said inner wall of a magnitude to cause said fluid to attach to said inner wall and that for rates of rotation of said fluid below said value the fluid does not attach to said wall, and a fluid receptor defined by a wall providing a first ingress orifice located downstream of the large end of said member, said wall of said hollow member and said wall of said fluid receptor being discontinuous to provide a space therebetween, said receptor being located such that there is a large change in fluid flow to said first ingress orifice upon said stream of fluid attaching to said inner wall of said member.

2. The combination according to claim 1 wherein said first ingress orifice is coaxial with said hollow member and is smaller than said large opening in said hollow member so that flow to said receptor is reduced upon said stream of fluid attaching to said wall.

3. The combination according to claim 2 wherein said receptor further comprises an annular ingress orifice intercepted by a projection of said outwardly diverging wall so that flow to said annular ingress orifice is increased upon said stream of fluid attaching to said wall.

4. The combination according to claim 2 further comprising means for detecting said large change in flow to said first ingress orifice.

5. In a vortex amplifier system providing first and second output fluid streams, a readout means for determining when the rate of rotation of fluid exiting from a vortex amplifier exceeds either limit of a desired range of rates of rotation of said fluid, said readout means comprising first and second hollow members each having a larger and a smaller opening at the ends thereof and a conical wall extending between said openings, the apical angle of said walls being different and said walls being coaxial with the axis of flow of said output fluid streams, said members being positioned such that said narrow opening of said first member receives said first output fluid stream and said narrow opening of said second member receives said second fluid stream, said apical angles of said walls being such that for rates of rotation of said first and second output fluid streams below respective first and second predetermined rates said first and second output fluid streams assume substantially conical flow patterns having apical angles which are dependent upon the respective rates of rotation of said first and second output fluid streams and for rates of rotation of said first and second output fluid streams above said respective first and second predetermined rates said first and second output fluid streams attach to the conical wall of their respective hollow members, first and second fluid receptors each having a wall providing a distinct ingress orifice, each located downstream of said larger opening of a different one of said members, said wall of each said hollow member and said wall of each said fluid receptor, respectively, being discontinuous to provide spaces between said walls, said receptors being located such that there is a large change in fluid flow to each upon its associated output fluid stream attaching to its associated wall.

6. The combination according to claim 5 further comprising third and fourth receptors positioned concentrically about said first and second receptors respectively and in line with a conical wall of a respective one of said first and second hollow members such that fluid flow to said third and fourth receptors is increased upon its associated output fluid stream attaching to its associated conical wall.

7. A device for sensing rate rotation of an unconfined stream of fluid having an axial rate of flow, comprising a hollow member having an outwardly diverging inner wall providing large and small openings at the ends of said member, means for introducing fluid through the small opening in said member, whereby rotating fluid proceeding through said small opening flares outwardly in the region between said small and large openings at an apical angle functionally related to the rate of rotation of the fluid, said inner wall having a predetermined apical angle such that for rates of rotation of the fluid above a predetermined value said fluid approaches sufficiently close to said inner wall to produce boundary layer effects between the fluid and said inner wall of a magnitude to cause said fluid to attach to said inner wall and that for rates of rotation of said fluid below said value the fluid does not attach to said wall, and a fluid receptor located downstream of the end of said member having the large opening therein, the region between said large opening and said receptor being vented to ambient pressure, said receptor being located such that there is a large change in fluid flow to said receptor upon said stream of fluid attaching to said inner wall of said member.

8. The combination according to claim 7 wherein said receptor has a fluid ingress orifice smaller than said large opening in said hollow member so that flow to said receptor is reduced upon said stream of fluid attaching to said wall.

9. The combination according to claim 7 further comprising an additional receptor concentrically disposed about said receptor and in line with the diverging surface of said wall so1 that flow to said additional receptor is increased upon said stream of fluid attaching to said wall.

10. The combination according to claim 7 further comprising a vortex chamber having an egress orifice comprising said small opening of said member, and means for detecting said large change in flow to said receptor.

11. In a vortex amplifier system providing first and second output fluid streams, a readout means for determining when the rate of rotation of fluid exiting from a vortex amplifier exceeds either limit of a desired range of rates of rotation of said fluid, said readout means comprising first and second hollow members each having a larger and a smaller opening in the ends thereof and a conical wall extending between said openings, the apical angle of said walls being different and said walls being coaxial with the axis of flow of said output fluid streams, said members being positioned such that said narrow opening of said first member receives said first output fluid stream and said narrow opening of said second member receives said second fluid stream, said apical angles of said walls being such that for rates of rotation of said first and second output fluid streams below respective first and second predetermined rates said first and second output fluid streams assume substantially conical flow patterns having apical angles which are dependent upon the respective rates of rotation of said first and second output fluid streams and for rates of rotation of said first and second output fluid streams above said respective first and scecond predetermined rates said first and second output fluid streams attach to the conical wall of their respective hollow members, first and second fluid receptors each located downstream of said larger opening of a different one of said members, wherein the regions between the larger openings of said members and a respective receptor are vented to ambient pressure, said receptors being located such that there is a large change in fluid flow to each upon its associated output fluid stream attaching to its associated wall.

References Cited

UNITED STATES PATENTS 3,219,048  11/1965  Palmisano _____ 137—81.5

FOREIGN PATENTS 605,691  11/1934  Germany.

SAMUEL FEINBERG, Primary Examiner